US008781082B1

(12) United States Patent
Wilson (10) Patent No.: US 8,781,082 B1
(45) Date of Patent: Jul. 15, 2014

(54) SYSTEMS AND METHODS OF INTERACTIVE VOICE RESPONSE SPEED CONTROL

(75) Inventor: Steven Richard Wilson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 923 days.

(21) Appl. No.: 12/244,066

(22) Filed: Oct. 2, 2008

(51) Int. Cl.
*H04M 11/00* (2006.01)

(52) U.S. Cl.
USPC ...................................... 379/88.18; 379/88.27

(58) Field of Classification Search
USPC ............ 379/88.18, 88.02; 348/14.09; 386/68; 704/270; 725/135; 719/322
See application file for complete search history.

(56) References Cited

U.S. PATENT DOCUMENTS

| | | | |
|---|---|---|---|
| 5,884,262 A * | 3/1999 | Wise et al. ................. | 704/270.1 |
| 7,336,886 B2 * | 2/2008 | Hsi ............................... | 386/343 |
| 7,536,704 B2 * | 5/2009 | Pierre et al. ...................... | 725/58 |
| 7,873,261 B2 * | 1/2011 | Tischer .......................... | 386/343 |
| 2003/0070182 A1 | 4/2003 | Pierre et al. | |
| 2004/0081293 A1 * | 4/2004 | Brown et al. .............. | 379/88.02 |
| 2004/0207724 A1 * | 10/2004 | Crouch et al. ............. | 348/14.09 |
| 2005/0094969 A1 | 5/2005 | Hsi | |
| 2006/0059426 A1 | 3/2006 | Ogikubo | |
| 2008/0066086 A1 * | 3/2008 | Whatmough et al. ........ | 719/322 |

OTHER PUBLICATIONS

O'Sullivan, Daniel: "Adaptive Audio TM", SpeechTEK, The Voice Solutions Showcase, Aug. 8, 2006, 17 pgs.

* cited by examiner

*Primary Examiner* — Simon Sing
*Assistant Examiner* — Van D Huynh
(74) *Attorney, Agent, or Firm* — Kane Kessler, P.C.; Barry E. Negrin (57) ABSTRACT

A user may accelerate or decelerate the speed of playback of a recorded message provided by an interactive voice response (IVR) system at any time during the course of listening to the recorded message. The user may provide speed control instructions using predetermined keys or buttons on a communications device to modify the speed of the recorded message playback. Alternatively or additionally, the user may speak words to adjust the speed that a recorded message is being played to them. A speed control instruction may cause some or all of the recorded message to be repeated.

21 Claims, 6 Drawing Sheets

SYSTEMS AND METHODS OF INTERACTIVE VOICE RESPONSE SPEED CONTROL

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/244,074, and U.S. patent application Ser. No. 12/244,079, each filed concurrently and each entitled "Systems And Methods Of Interactive Voice Response Speed Control."

BACKGROUND

Speech recognition, also referred to as voice recognition, converts spoken words to machine-readable input. Speech recognition in the field of telephony is commonplace. Speech recognition applications include voice dialing (e.g., "call home"), call routing (e.g., "make a collect call"), and simple data entry.

In telephony, interactive voice response, or IVR, is a phone technology that allows a computer to detect voice and touch tones using a normal phone call. An IVR system can respond with prerecorded or dynamically generated audio to further direct users on how to proceed. IVR systems can be used to control almost any function where the interface can be broken down into a series of simple menu choices. For example, a user dials a phone number that is answered by an IVR system. The IVR system executes an application which is tied to the number dialed. As part of the application, prerecorded audio files or dynamically generated text to speech audio explain the options available to the user. The user is given the choice to select options using DTMF (dual-tone multi-frequency) tones or spoken words. Examples of typical IVR applications are telephone banking and credit card transactions.

Speech recognition and phone menu systems that route users' calls are problematic and frustrating. IVR is often criticized as being unhelpful and difficult to use due to poor design and lack of appreciation of the user's needs. Some users object to providing voice response to an automated system and prefer speaking with a human respondent.

Additionally, speech recognition and phone menu systems often have recorded message playback speeds that are either too fast or too slow for a user of the system. If the playback speed is too fast, the user may not understand the communication and the system may be unusable for them. If the playback speed is too slow, it may be frustrating for the user and this may contribute to slower or limited adoption. It is also possible that a playback speed that is acceptable at one point in a session with a user is not acceptable in another point in the session with the user, creating further frustration.

SUMMARY

The speed of playback of a recorded message provided by an interactive voice response (IVR) system may be adjusted by a user at any time while the user is listening to the recorded message.

In an implementation, a user may provide speed control instructions using predetermined keys or buttons on a communications device to modify the speed of the recorded message playback. Alternatively or additionally, the user may speak words to adjust the speed that a recorded message is being played to them. A speed control instruction may cause some or all of the recorded message to be repeated.

In an implementation, data pertaining to a user and/or a recorded message may be stored, retrieved, and/or analyzed. Such data or analysis may be used in an adjustment of the playing of the recorded message or another recorded message to a user.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
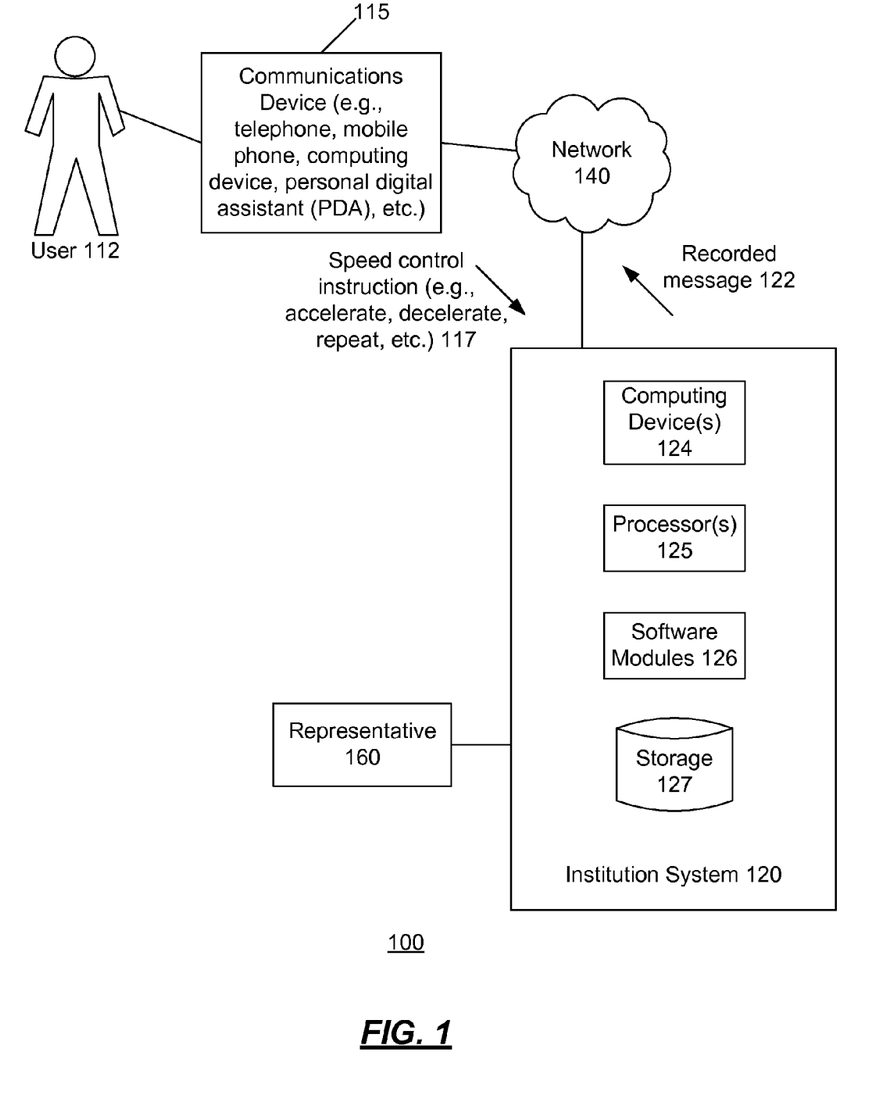
FIG. 1 is a block diagram of an implementation of a system that may be used to provide interactive voice response speed control.

FIG. 1 is a block diagram of an implementation of a system 100 that may be used to provide interactive voice response (IVR) speed control. A user 112 may be a caller to an institution system 120 to obtain information about an institution associated with the institution system 120, products or services, or to speak with a representative 160, for example.

The institution may be any type of entity or business. For example, the institution may be a financial services institution, a credit card association or member of a credit card association, a retail bank, an investment bank, an investment company, etc. The institution system 120 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. Systems and/or sub-systems of the institution system 120 may provide an IVR platform that may be used in conjunction with aspects and embodiments described herein.

The user 112 may have a communications device 115, such as a corded or cordless telephone, a mobile phone, a personal digital assistant (PDA), a handheld computing device, a personal computer (PC), or any type of computing device that may be used to transmit and receive sound. An example computing device and its components are described in more detail with respect to FIG. 6.

In addition to a microphone and a speaker for receiving and playing audio, respectively, in an implementation, the communications device 115 may comprise a keypad, a keyboard, a touchscreen, or any other type of input device that can receive input from the user 112. This allows the communications device 115 to be used by the user 112 as an input device for interacting with the institution system 120. The user 112 may speak commands or input commands, e.g., by pushing buttons or touching the screen of the communications device 115 as an input method. In an implementation, items on a display of the communications device 115 may be selected or moved with a finger or stylus, and finger gestures may be used to convey commands. There are a number of types of input technology available and any of them may be implemented within the communications device 115.

The communications device 115 may operate through transmission of electric signals over a network 140. The network 140 may be any type of telephone network or communications network such as an intranet, the Internet, a local area network (LAN), a wide area network (WAN), a wireless fidelity (WiFi) network, a public switched telephone network (PSTN), a cellular network, a voice over Internet protocol (VoIP) network, and the like.

The institution system 120 may play an audio file, such as a recorded message 122, over the network 140 to the user 112 via the communications device 115. The user 112 may provide a speed control instruction 117 to the institution system 120 via the communications device 115 to accelerate (i.e., speed up) or decelerate (i.e., slow down) the speed of the playback of the recorded message 122 at any time during a session when the user 112 is listening to the recorded message 122. The speed control instruction 117 may also provide an instruction to repeat all or some portion of the recorded message 122. In an implementation, a predetermined amount of the message may be repeated, such as the previous 5 seconds, 10 seconds, etc. The user may choose to repeat more than once in order to have a longer portion of the message replayed. In an implementation, the entire message may be repeated pursuant to a speed control instruction 117 of repeat.

The speed control instruction 117 may take the form of spoken commands, such as "faster", "slower", "repeat", etc. and/or may take the form of commands selected by the user 112 via the communications device 115, such as pushing a first button on a keypad (or keyboard, touchscreen, etc.) to choose to speed up, a second button on the keypad to slow down, and a third button on the keypad to repeat. The buttons may correspond to selectable numbers as provided by the institution system 120, such as "press or say '1' to speed up, press or say '2' to slow down, press or say '3' to repeat", for example. In an implementation, predetermined keys on a touch tone phone may be used to modify the speed of the recorded message playback (e.g., '5' for repeat, '7' for faster playback, and '9' for slower playback).

The user 112 may thus speak or enter commands and/or numbers into the communications device 115 to instruct the institution system 120 to accelerate, decelerate, or repeat the recorded message 122 that is being played to the user 112. In this manner, the user 112 may have control over the speed of the playback of the recorded message 122. In an implementation, more than one speed control instruction 117 may be provided to the institution system 120 by the user 112, and more than one recorded message 122 may be played back to the user 112. Any known voice recognition technology may be used by the institution system 120 to recognize spoken instructions received from the user 112. In an implementation, some or all of the recorded messages that may be played to the user 112 may be related to financial services information, such as banking, brokerage services, insurance, loans, retirement, etc.

In an implementation, the institution system 120 may analyze aspects of the instructions received from the user 112 and take appropriate action such as changing the playback speed further and/or transferring the user 112 to a representative 160. For example, if the user 112 says "repeat" or "excuse me" (or provides equivalent instructions), a certain portion (e.g., 5 seconds, 10 seconds, etc.) of the recorded message 122 that had been previously played may be repeated, and the playback speed may be slowed down a predetermined amount. As another example, if the user 112 chooses a menu selection provided in the recorded message 122 before the recorded message 122 is finished playing, further playback of recorded messages to the user 112 may be accelerated by a predetermined amount.

In an implementation, the user 112 may provide identification and/or authorization information (e.g., PIN (personal identification number), password, etc.) to the institution system 120 via the communications device 115 in any known manner. Any techniques for identification and authorization may be used. The institution system 120 may have appropriate security mechanisms in place to prevent unauthorized third parties from intercepting the user's information.

The institution system 120 may comprise storage 127 to store preferences of the user 112, preferences associated a telephone number from which a session originated, preferences of other users, data relating to one or more sessions with one or more users, etc. The storage 127 may also store information such as audio files, recorded messages, cues, prompts, menu items, directory information, information pertaining to products and services, information about the institution system, etc. The information may be retrieved from the storage 127 and played to the user 112 during a session when the user 112 calls in and/or when requested by the user 112 or as part of a call navigation technique. The storage 127 may also contain identification and authentication information pertaining to the user 112, so that the user 112 may efficiently be identified and authenticated by the institution system 120.

In an implementation, the institution system 120 may identify the user 112 and play the recorded message 122 at a speed preference earlier selected by the user 112. In an implementation, the institution system 120 may identify the phone number where the user 112 is calling from and play a message at a speed preference earlier selected by a user at that phone number.

A session may be considered to be taking place when the user 112 is engaged in a call with the institution system 120. As described further herein, when a recorded message 122 is being played to a user 112 during a session, the user 112 may select to accelerate, decelerate, or repeat the playback of the recorded message 122.

The audio files corresponding to the recorded messages may be stored digitally, and therefore they may be modified or filtered potentially in real time. In an implementation, a message for playback may be stored in storage 127 as a single file, and may be processed on the fly so that the message playback may be accelerated or decelerated to any speed, not only to fixed speeds.

In an implementation, a message for playback may be stored as multiple files, with each file pertaining to a different speed of playback. Thus, multiple audio files for a recorded message may be used, one for each different available playback speed. The message may be recorded at different speeds and played back at a speed associated with the user selection from the associated stored file. In an implementation, sync codes may be used to sync the files corresponding to the different speeds as the files for playback are changed as the user 112 provides speed control instructions 117 to change the speed of the playback of the recorded message 122.

The institution system 120 may comprise one or more processors 125 and software modules 126 that may act in conjunction with one or more computing devices 124 in the performance of the techniques and operations described herein. Examples of software modules 126 may include modules that may be used to provide IVR and may be used to set playback speed and other settings and operating parameters, that may retrieve and playback recorded messages to the user 112, and that may receive speed control instructions from the user 112 regarding playback as well as other input provided by the user 12. While specific functionality is described herein as occurring with respect to specific modules, the functionality may likewise be performed by more, fewer, or other modules. As noted above, an example computing device and its components are described in more detail with respect to FIG. 6.

Figure 2:
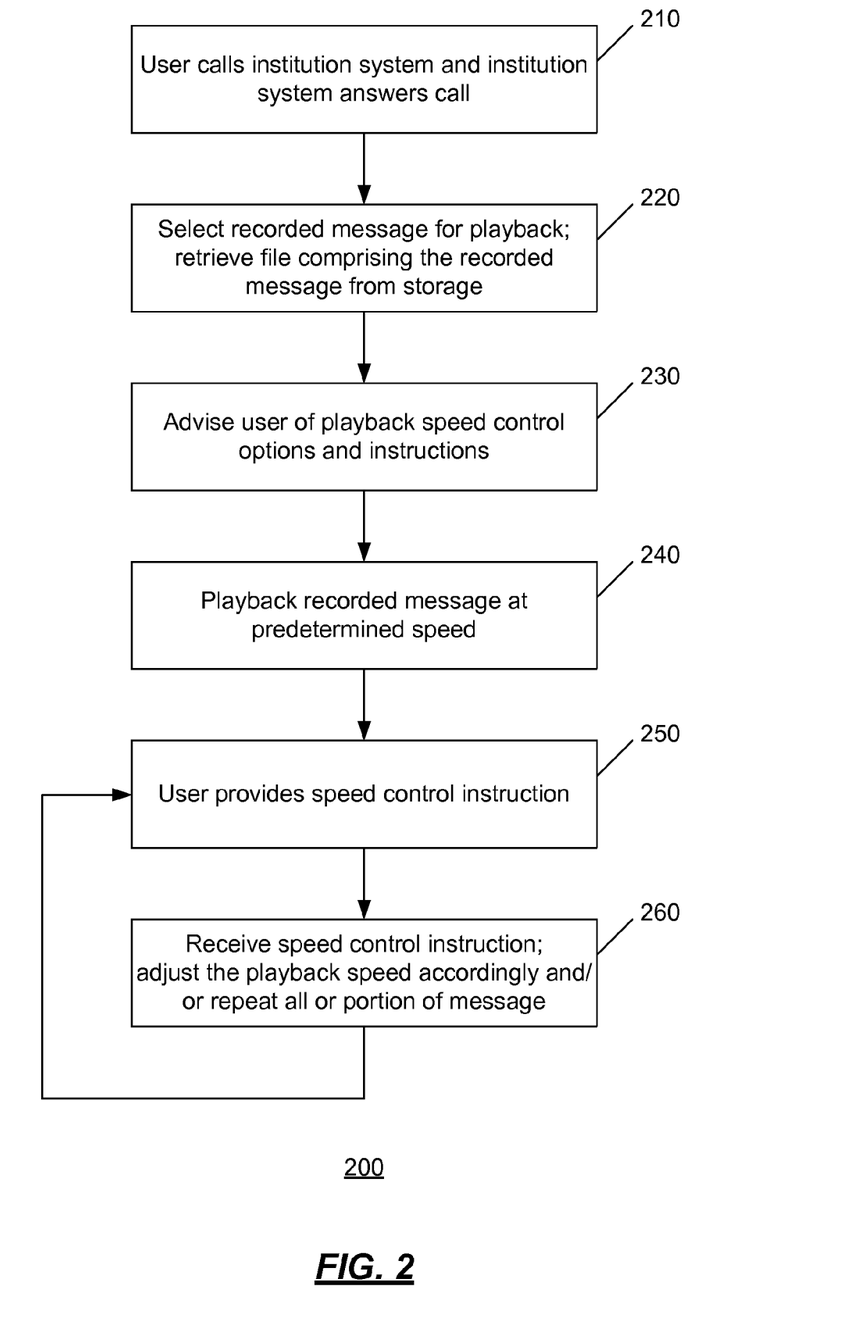
FIG. 2 is an operational flow of an implementation of a method that may be used to provide interactive voice response speed control.

FIG. 2 is an operational flow of an implementation of a method 200 that may be used to provide interactive voice response speed control. At 210, a user may call into an institution system using a communications device and the institution system may answer the call. At 220, the institution system may select a recorded message for playback to the user and may retrieve a file, such as an audio file or other data file, comprising the recorded message from storage.

At 230, the institution system may advise the user of the speed control options and instructions that the user may use to control the playback speed of the recorded message that may be played to the user. The user may be advised via an audio file. As noted above, in an implementation, predetermined keys on a touch tone phone, predetermined buttons on a computing device, spoken words, etc. may be used to modify the speed of the message playback (e.g., one key for faster playback, another key for slower playback, and a third key to repeat all or a portion of the recorded message).

At 240, the recorded message may be played back to the user at a predetermined speed, e.g. set by the institution system. At 250, the user may provide a speed control instruction such as an instruction to accelerate or decelerate the speed that the recorded message is being played. In an implementation, the user may provide an instruction to repeat the message or a portion of the message. The portion of the message to be repeated may be determined by the institution system. The speed control instruction may be spoken or may be provided by another input technique such as keypad, button, keyboard, etc.

At 260, the institution system may receive the speed control instruction and may adjust the playback speed of the recorded message accordingly and/or repeat the message or portion of the message. The user may provide further speed control instructions during the session and the speed and/or playback may be further adjusted in accordance with those instructions.

Figure 3:
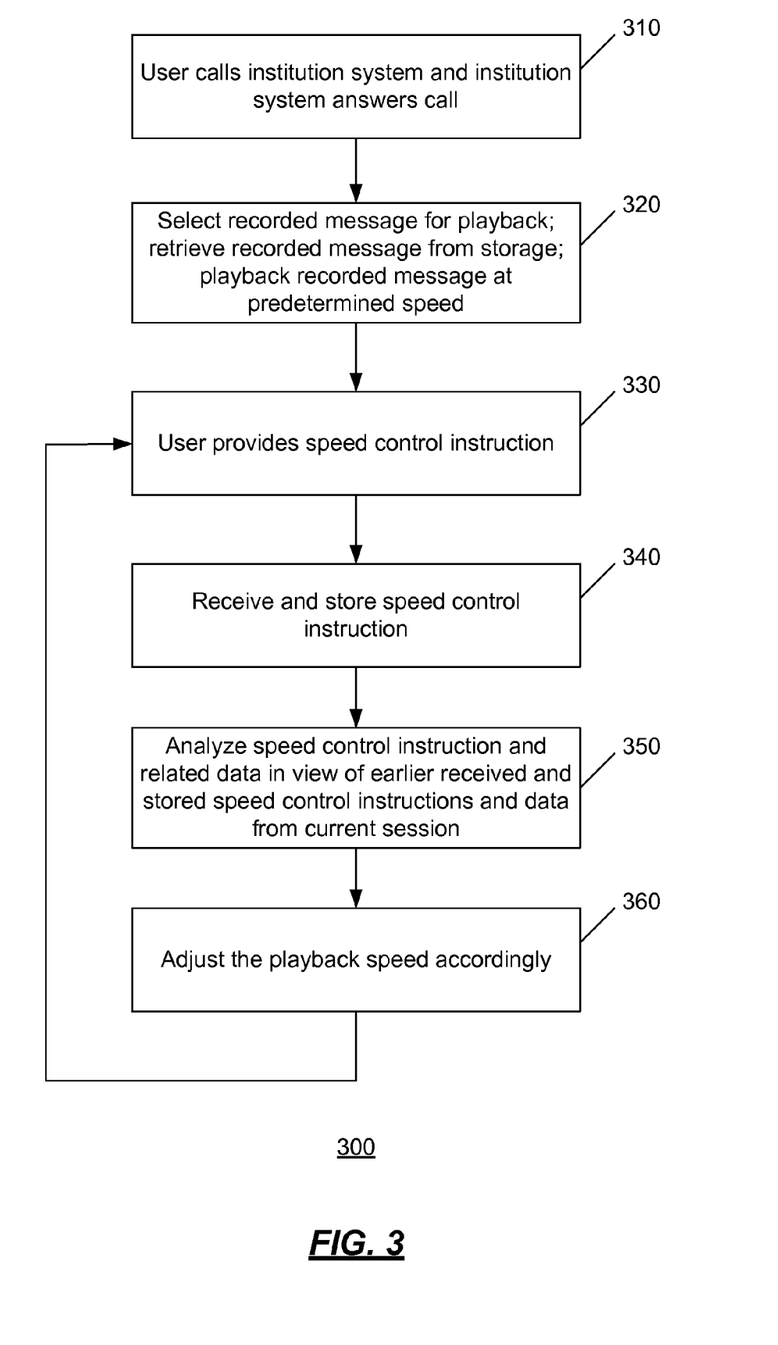
FIG. 3 is an operational flow of another implementation of a method that may be used to provide interactive voice response speed control.

FIG. 3 is an operational flow of another implementation of a method 300 that may be used to provide interactive voice response speed control. A user may call into an institution system using a communications device at 310 and the institution system may answer the call. At 320, the institution system may select a recorded message for playback to the user, may retrieve a file comprising the recorded message from storage, and may playback the recorded message to the user at a predetermined speed.

At 330, similar to 250, the user may provide a speed control instruction to accelerate or decelerate the speed that the recorded message is being played or to repeat the recorded message or a portion of it. At 340, the institution system may receive and store the speed control instruction.

At 350, the institution system may analyze the speed control instruction and/or related data (e.g., timing data, selection data, etc.) in view of any received and stored instructions and/or related data from earlier in the current session. At 360, the institution system may adjust the playback speed based on the results of the analysis. In this manner, the user's speed control instructions and related data during a session may be monitored and the playback speed of the recorded message and/or other aspects of the call may be adjusted based on the monitoring. Processing may continue at 330.

In an implementation, the institution system may analyze how many times in a row the user has requested to repeat the message (or a portion of the message). If the user has requested a repeat a predetermined number of times within a session or within a certain time period, the call may be transferred to a representative.

In another implementation, if the user requests a repeat, then the message or a portion of the message may be repeated as determined by the institution system, and the playback speed may be decelerated. Additionally or alternatively, for example, if the user makes a selection (e.g., a menu selection provided by the recorded message) before the recorded message is finished playing, further recorded messages may be played back to the user at an accelerated speed. In an implementation, the playback speed may be speeded up or slowed down based on user response times to cues and/or prompts.

Figure 4:
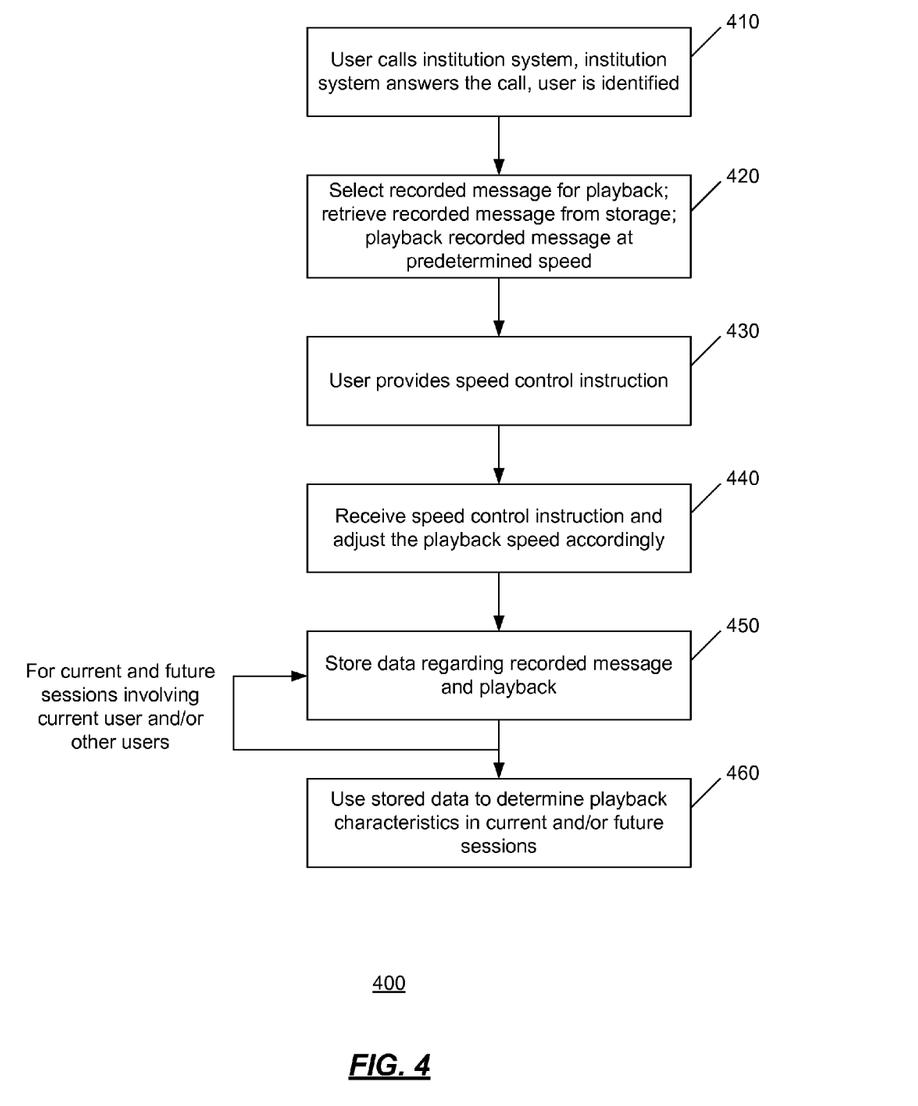
FIG. 4 is an operational flow of another implementation of a method that may be used to provide interactive voice response speed control.

FIG. 4 is an operational flow of another implementation of a method 400 that may be used to provide interactive voice response speed control. At 410, a user may call into an institution system using a communications device, the institution system may answer the call, and the user may be identified using any known technique. For example, the institution system may answer the call and respond with a prompt for identification and/or authorization information. The user may be asked to identify himself using a PIN or password, for example.

At 420, similar to 320, the institution system may select a recorded message for playback to the user, may retrieve a file comprising the recorded message from storage, and may playback the recorded message to the user at a predetermined speed. At 430, similar to 330, the user may provide a speed control instruction to the institution system. At 440, the institution system may receive the speed control instruction and adjust the playback speed accordingly or repeat the message or a portion of the message.

At 450, the institution system may store data regarding the recorded message that is being played back. The data may identify the particular message, the type of message (e.g., lists, instructions, cues, prompts, etc.), other characteristics of the message, and/or the user's speed control instructions regarding the playback of the message, etc., for example. The data may be associated with the user, the telephone number of the user, other characteristics of the user, the message, the message type, and/or other characteristics of the message, etc. in a storage device. Additionally, further data from current and future sessions involving the recorded message(s), the user, and/or other users may be stored.

The stored data may be used at 460 to determine playback characteristics, such as playback speed, for recorded messages in the current session or in future sessions involving the user or other users. In an implementation, user preferences for each message type may be stored as metadata (e.g., user uses a first slower speed to listen to lists, and uses a second faster speed to listen to instructions, etc.). This information (e.g., speed preferences) may be stored and may be used in current and/or future sessions involving the user or other users.

Figure 5:
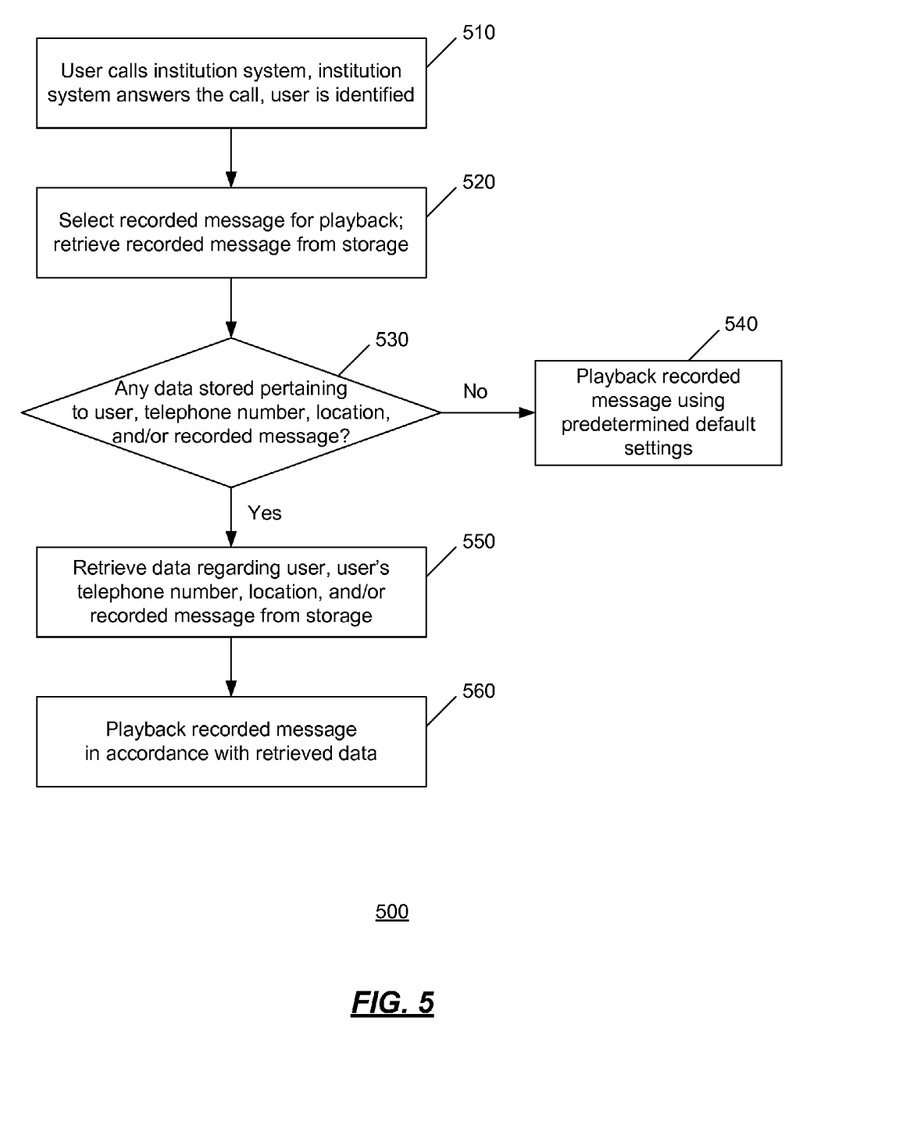
FIG. 5 is an operational flow of another implementation of a method that may be used to provide interactive voice response speed control.

FIG. 5 is an operational flow of another implementation of a method 500 that may be used to provide interactive voice response speed control. A user may call into an institution system at 510, the institution system may answer the call, and the user may be identified using any known technique. At 520, the institution system may select a recorded message for playback and may retrieve a file comprising the recorded message from storage.

At 530, it may be determined whether there is any data in storage pertaining to the user, the telephone number that the user is calling from, the geographic location the user is calling from (based on information obtained from the incoming telephone call to the institution system), or the recorded message that may be used to determine playback characteristics of a recorded message to the user. In an implementation, the data may be directed to playback speed, user preferences for playback speed, etc. Additionally or alternatively, the gender (male or female), accent, and/or other characteristics (e.g., tone, volume, etc.) of the voice of the recorded message may be determined based on the data, such as the geographic location the user is calling from or the gender of the user, for example.

If there is no stored data as determined at 530, then the recorded message may be played back at 540 using predetermined default settings. If there is stored data as determined at 530, the data may be retrieved from storage at 550. At 560, the recorded message may be played back in accordance with the retrieved data.

In an implementation, the playback speed may be set based on whether or not the recorded message has been previously played back to the user. If so, the recorded message may be played back to the user at a faster speed than if the recorded message had not previously been played back to the user.

Exemplary Computing Arrangement

Figure 6:
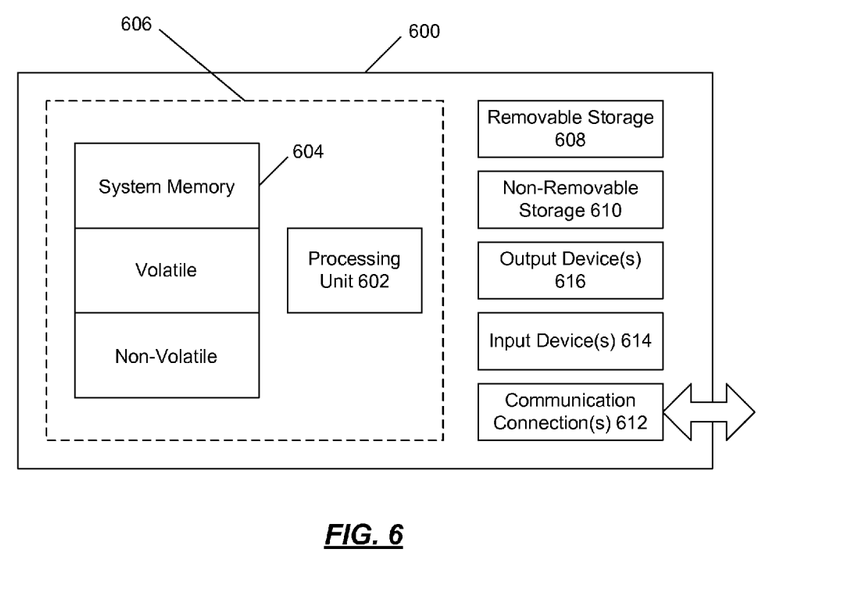
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device.

One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment.

Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of interactive voice response speed control, comprising:
   identifying a user of an institution system;
   playing a recorded message utilizing the institution system, to the user over a network, wherein the institution system advises the user of a speed control instruction and wherein the institution system implements a speed preference previously selected by the user;
   receiving the speed control instruction from the user over the network via a communications device associated with the user;
   monitoring data related to the speed control instruction and associated with previous user activity;
   analyzing the speed control instruction and the monitored previous user activity; and
   adjusting the playing of the recorded message to the user responsive to the analysis by playing the recorded message in a speed different from the speed control instruction and the previous user activity.

2. The method of claim 1, wherein the speed control instruction comprises an instruction to accelerate a speed of the playing of the recorded message.

3. The method of claim 1, wherein the speed control instruction comprises an instruction to decelerate a speed of the playing of the recorded message.

4. The method of claim 1, wherein the speed control instruction comprises an instruction to repeat the playing of a predetermined amount of the recorded message.

5. The method of claim 1, wherein adjusting the playing of the recorded message comprises adjusting a speed of the playing of the recorded message.

6. The method of claim 1, wherein the speed control instruction comprises a spoken command from the user into the communications device.

7. The method of claim 1, wherein the speed control instruction comprises a command generated by the communications device responsive to a selection of a button or a key on a keypad associated with the communications device.

8. A non-transitory computer-readable medium comprising computer-readable instructions tor interactive voice response speed control, said non-transitory computer-readable instructions comprising instructions executed to:
   identify a user of an institution system;
   play a recorded message to the user utilizing the institution system, over a network, wherein the institution system advises the user of a speed control instruction and wherein the institution system implements a speed preference previously selected by the user;
   receive the speed control instruction from the user over the network via a communications device associated with the user;
   monitor data related to the speed control instruction and associated with previous user activity;
   analyze the speed control instruction and the monitored previous user activity; and
   adjust the playing of the recorded message to the user responsive to the analysis by playing the recorded message in a speed different from the speed control instruction and the previous user activity.

9. The non-transitory computer-readable medium of claim 8, wherein the speed control instruction comprises an instruction to accelerate a speed of the playing of the recorded message.

10. The non-transitory computer-readable medium of claim 8, wherein the speed control instruction comprises an instruction to decelerate a speed of the playing of the recorded message.

11. The non-transitory computer-readable medium of claim 8, wherein the speed control instruction comprises an instruction to repeat the playing of a predetermined amount of the recorded message.

12. The non-transitory computer-readable medium of claim 8, wherein the instructions that adjust the playing of the recorded message comprise instructions that adjust a speed of the playing of the recorded message.

13. The non-transitory computer-readable medium of claim 8, wherein the speed control instruction comprises a spoken command from the user into the communications device.

14. The non-transitory computer-readable medium of claim 8, wherein the speed control instruction comprises a command generated by the communications device responsive to a selection of a button or a key on a keypad associated with the communications device.

15. A system for interactive voice response speed control, comprising:
- a memory; and
- a processor coupled to the memory to:
- identify a user of an institution system;
- play a recorded message to the user utilizing the institution system over a network, wherein the institution system advises the user of a speed control instruction and wherein the institution system implements a speed preference previously selected by the user;
- receive the speed control instruction from the user over the network via a communications device associated with the user;
- monitor data related to the speed control instruction and associated with previous user activity;
- analyze the speed control instruction and the monitored previous user activity; and
- adjust the playing of the recorded message to the user responsive to the analysis by playing the recorded message in a speed different from the speed control instruction and the previous user activity.

16. The system of claim 15, wherein the speed control instruction comprises an instruction to accelerate a speed of the playing of the recorded message.

17. The system of claim 15, wherein the speed control instruction comprises an instruction to decelerate a speed of the playing of the recorded message.

18. The system of claim 15, wherein the speed control instruction comprises an instruction to repeat the playing of a predetermined amount of the recorded message.

19. The system of claim 15, wherein adjusting the playing of the recorded message comprises adjusting a speed of the playing of the recorded message.

20. The system of claim 15, wherein the speed control instruction comprises a spoken command from the user into the communications device.

21. The system of claim 15, wherein the speed control instruction comprises a command generated by the communications device responsive to a selection of a button or a key on a keypad associated with the communications device.

* * * * *